United States Patent
Olson (10) Patent No.: US 10,409,545 B1
(45) Date of Patent: Sep. 10, 2019

(54) DIGITAL IDENTIFICATION OF DEVICES ATTACHED TO SERIAL COMMUNICATION CABLES

(71) Applicant: Starkey Laboratories, Inc., Eden Prairie, MN (US)

(72) Inventor: Kyle Olson, St. Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/955,307

(22) Filed: Apr. 17, 2018

(51) Int. Cl.
| | |
|---|---|
| *G06F 3/16* | (2006.01) |
| *G06F 13/42* | (2006.01) |
| *H04R 25/00* | (2006.01) |
| *H04B 3/02* | (2006.01) |

(52) U.S. Cl.
CPC .......... *G06F 3/162* (2013.01); *G06F 13/4282* (2013.01); *H04B 3/02* (2013.01); *H04R 25/556* (2013.01); *G06F 2213/0016* (2013.01)

(58) Field of Classification Search
CPC .................. G06F 3/162; G06F 13/4282; G06F 2213/0016; G06F 2225/021; G06F 2225/025; G06F 25/65; G06F 1/06; H04R 3/02; H04R 25/556; H04R 29/001; H04R 25/554; H04R 25/505; H04R 2225/51; H04R 2420/07; H04R 3/00
USPC .......................... 381/312, 314, 323, 328, 330
See application file for complete search history.

(56) References Cited

U.S. PATENT DOCUMENTS

| | | | |
|---|---|---|---|
| 6,144,748 A * | 11/2000 | Kerns .................. | H04R 25/556 381/312 |
| 7,860,572 B2 * | 12/2010 | Ibrahim ............. | A61N 1/36036 607/57 |
| 8,433,072 B2 | 4/2013 | Muller et al. | |
| 8,467,553 B2 | 6/2013 | Schefer | |
| 8,938,578 B2 * | 1/2015 | Gopalakrishnan ......................... | G11C 11/4063 711/105 |
| 9,008,341 B2 | 4/2015 | Ryan | |
| 9,271,088 B2 * | 2/2016 | Andersen .................. | H03F 1/26 |
| 9,588,563 B2 * | 3/2017 | Rathi ....................... | G06F 1/266 |
| 9,880,895 B2 | 1/2018 | Mishra et al. | |
| 2005/0268000 A1 | 12/2005 | Carlson | |
| 2007/0282394 A1 * | 12/2007 | Segel .................. | A61N 1/36036 607/57 |
| 2008/0157714 A1 | 7/2008 | LeMay et al. | |
| 2010/0111315 A1 | 5/2010 | Kroman | |
| 2013/0083949 A1 | 4/2013 | Ryan | |

(Continued)

FOREIGN PATENT DOCUMENTS

EP 2744225 B1 6/2014

OTHER PUBLICATIONS

International Search Report and Written Opinion of International Application No. PCT/US2019/027719, dated Jul. 11, 2019, 12pp.

*Primary Examiner* — Binh Kien Tieu
(74) *Attorney, Agent, or Firm* — Shumaker & Sieffert, P.A.

(57) ABSTRACT

A first device receives a bit sequence from a second device via a serial communication cable having one or more wires that connect the first device to a first set of one or more pins of a first chip of the second device. The first chip has a second set of pins. For each respective pin of the second set of pins, the bit sequence includes a set of one or more bits for the respective pin that are based at least in part on whether a first voltage or a second voltage is applied to the respective pin. The first device determines, based on the bit sequence, a type of the second device.

24 Claims, 5 Drawing Sheets

(56) References Cited

U.S. PATENT DOCUMENTS

| | | | |
|---|---|---|---|
| 2013/0251165 A1* | 9/2013 | Jorgensen | H04R 25/30 |
| | | | 381/59 |
| 2014/0029331 A1* | 1/2014 | Gopalakrishnan | |
| | | | G11C 11/4063 |
| | | | 365/149 |
| 2015/0339257 A1 | 11/2015 | Hug et al. | |
| 2015/0346792 A1* | 12/2015 | Rathi | G06F 1/266 |
| | | | 713/310 |
| 2016/0360328 A1 | 12/2016 | Schmidt et al. | |
| 2018/0188768 A1* | 7/2018 | Skjoldborg | G06F 13/4269 |
| 2018/0192211 A1* | 7/2018 | Moller | H04R 25/505 |

* cited by examiner

DIGITAL IDENTIFICATION OF DEVICES ATTACHED TO SERIAL COMMUNICATION CABLES

TECHNICAL FIELD

This disclosure relates to inter-device communication.

BACKGROUND

Two devices may communicate via a serial communication cable. For example, a Receiver-in-Canal (RIC) device of a hearing aid may communicate with a receiver device via a serial communication cable. There may be a variety of situations in which one of the two devices needs to identify a type of the other device. For example, a first device may need to identify a type of a second device in order to properly format data that the first device sends to the second device. In other example, the first device may need to identify a type of the second device in order to determine how to interpret data received from the second device.

SUMMARY

This disclosure describes techniques for identifying devices that communicate via serial cables. In one example, this disclosure describes a method for inter-device communication, the method comprising: receiving, by the first device, a bit sequence from a second device via a serial communication cable having one or more wires that connect the first device to a first set of one or more pins of a first chip of the second device, the first chip having a second set of two or more pins, wherein, for each respective pin of the second set of pins, the bit sequence includes a set of one or more bits for the respective pin based at least in part on whether a first voltage or a second voltage is applied to the respective pin, the first voltage being different from the second voltage; determining, by the first device, based on the bit sequence, a type of the second device; generating, by the first device, based on the type of the second device, data appropriate for use by devices that belong to the type of the second device; and sending, by the first device, the data to the second device via the serial communication cable.

In another example, this disclosure describes a system comprising: a first device; a second device comprising a first chip, the first chip having a first set of one or more pins and a second set of two or more pins, wherein, for each respective pin of the second set of pins, the bit sequence includes a set of one or more bits for the respective pin based at least in part on whether a first voltage or a second voltage is applied to the respective pin, the first voltage being different from the second voltage; and a serial communication cable, wherein the serial communication cable has one or more wires that connect the first device to the first set of one or more pins of the first chip of the second device, wherein the first device is configured to: receive a bit sequence from the second device via the serial communication cable; determine, based on the bit sequence, a type of the second device; generate, based on the type of the second device, data appropriate for use by devices that belong to the type of the second device; and send the data to the second device via the serial communication cable.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

As mentioned above, two devices may communicate via a serial communication cable and at least one of the devices may need to determine a type of the other device. In other words, a device may need to determine a type of another device in order to perform inter-device communication with the other device. For instance, a first device and a second device may communicate via a serial communication cable and the first device may need to determine a type of the second device. This disclosure describes techniques that may improve how a device that communicates with one another via a serial communication cable identifies a type of the other device. The techniques of this disclosure may enable higher numbers of device types to be determined than technologies where different resistance values are used to determine device types. Furthermore, the techniques of this disclosure may be faster and consume less energy than systems in which device identifiers are retrieved from memory units.

As described herein, in one example, a first device may receive a bit sequence from a second device via an electrically conductive, serial communication cable having one or more electrically conductive wires that connect the first device to a first set of one or more electrically conductive pins of a first chip of a second device. The first chip also has a second set of electrically conductive pins. The first chip may also have a third set of one or more electrically conductive pins connected to a second chip of the second device. For each respective pin of the second set of pins, the bit sequence includes a set of one or more bits for the respective pin that is based at least in part on whether a first voltage or a second voltage is applied to the respective pin. In this example, the first voltage is different from the second voltage. Furthermore, in this example, the first device determines, based on the bit sequence, a type of the second device. In this example, the first device may generate, based on the type of the second device, data appropriate for use by the second type of device. Additionally, in this example, the first device may send the data to the second device via the serial communication cable.

Figure 1:
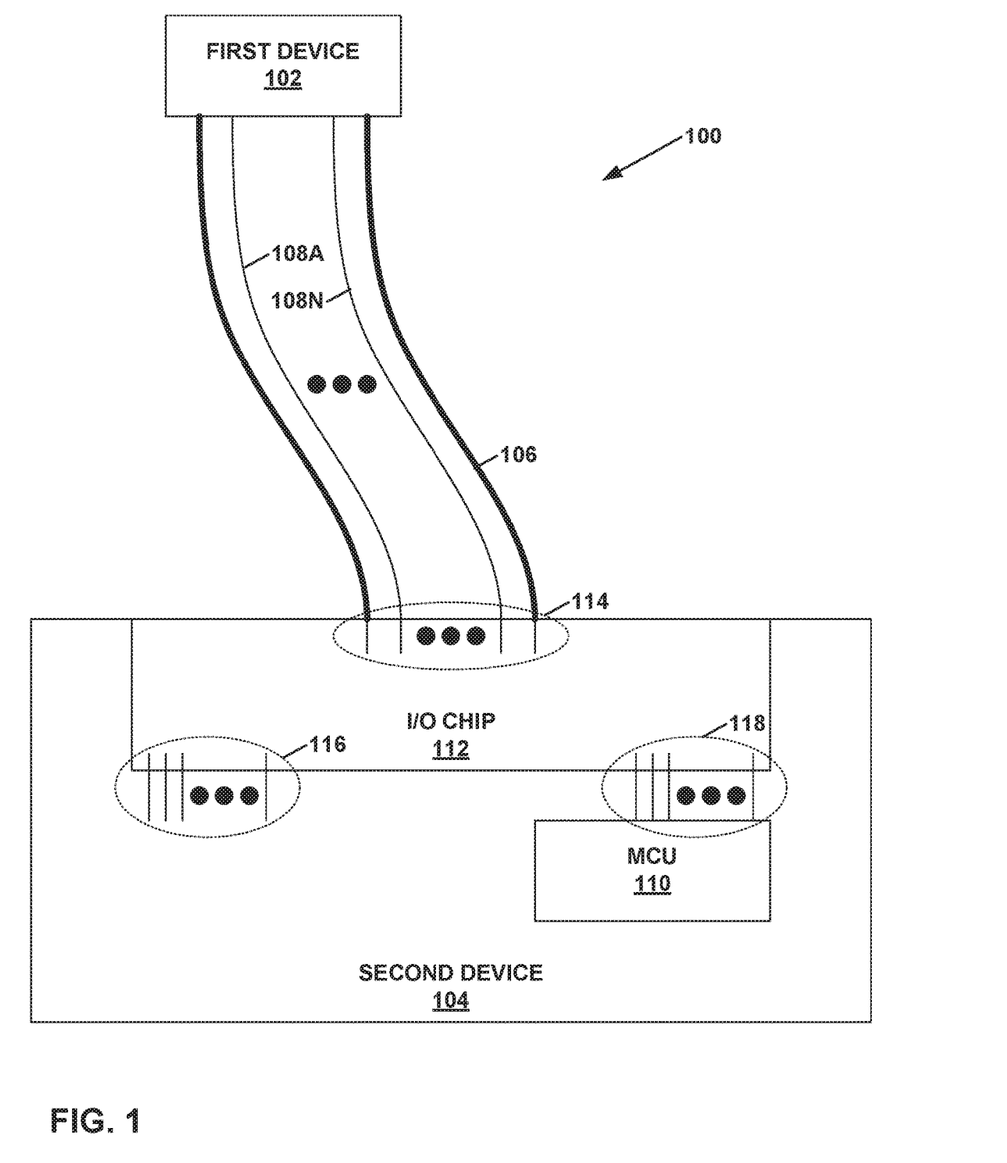
FIG. 1 illustrates an example system comprising a first device and a second device, in accordance with one or more techniques of this disclosure for identifying one or more devices that communicate via serial cables.

FIG. 1 illustrates an example system 100 comprising a first device 102 and a second device 104, in accordance with one or more aspects of this disclosure. Device 102 and device 104 may include various types of devices. For example, system 100 may be a hearing aid system, and device 102 may be a behind-the-ear (BTE) device or a receiver-in-canal (RIC) device. In this example, device 104 may be a bare receiver, a receiver with an ear mold, a receiver with one or more sensors, or another type of device. Such sensors may include integrated biometric sensors (pulse Ox, galvanic skin response (GSR), temperature sensors, electroencephalogram (EEG) sensors, electrooculography (EOG) sensors, electrocardiography (ECG) sensors, blood pressure, ear wax, accelerometer, or gyroscope), environmental sensors (pressure sensors, ultraviolet light sensors, temperature sensors, camera, wind sensors, audio sensors, or global positioning system (GPS) units), user interface sensors (capacitive touch, touch, proximity, gesture, or voice recognition), and so on. Device 102 may comprise one or more processors, such as microprocessors, digital signal processors (DSPs), application specific integrated circuits (ASICs), field programmable gate arrays (FPGAs), and so on.

Device 102 and device 104 communicate via a serial communication cable 106. In some examples, serial communication cable 106 comprises an I$^2$C cable. In some examples, serial communication cable 106 may be an I3C cable, a Serial Peripheral Interface (SPI) cable, a Universal Asynchronous Receiver-Transmitter (UART) cable, data over power (zero-wire, one-wire proprietary schemes), a Universal Synchronous Receiver-Transmitter (USART) cable, an Enhanced/Addressable Universal Asynchronous Receiver Transmitter (EUSART) cable, an Inter-IC sound (I$^2$S) cable, a Universal Serial Bus (USB) cable, a Controller Area Network (CAN) bus cable, an Ethernet™ cable, or another type of cable. Serial communication cable 106 includes a set of one or more wires 108A through 108N (collectively, "wires 108"). Each of wires 108 is able to transmit electrical signals from first device 102 to second device 104, or vice versa.

In the example of FIG. 1, second device 104 includes a microcontroller unit (MCU) 110 and an Input/Output (I/O) chip 112. Device 104 may also include additional components, such as sensors, microphones, speakers, power supplies, and so on. In different examples, MCU 110 may fulfill various roles. For instance, in one example where device 104 is a receiver with integrated biometric sensors, MCU 110 may digitize and process signals from various sensors, such as microphones, body temperature sensors, accelerometers, and so on. In this example, MCU 110 may send the processed signals to first device 102. In some examples, MCU 110 processes signals and other data from first device 102 to output electrical signals that drive a speaker.

In some examples, I/O chip 112 is an I/O expander chip, such as a Texas Instruments (TI) TCA7408 for 8 bit or TCA6416A for 16 bit. In examples where the serial communication cable 106 is an I$^2$C communication cable, I/O chip 112 may be an I$^2$C I/O expander chip. In general, I/O chip 112 serves to increase the number of input and output pins available for use with MCU 110, to convert signals from serial communication cable 106 to signals usable by MCU 110, and/or to convert signals from MCU 110 to signals that can be communicated on serial communication cable 106. In other words, I/O chip 112 may enable MCU 110 to use more I/O pins than cable 106 has wires. For example, MCU 110 may only have a single output pin usable for communication with serial communication cable 106 and a single input pin usable for communication with serial communication cable 106. However, in this example, MCU 110 may have four wires that are usable for communicating data through cable 106 with only two wires for serial data communication.

As shown in the example of FIG. 1, I/O chip 112 may have three sets of pins 114, 116, and 118. Serial communication cable 106 has one or more wires 108 that connect first device 102 to the first set of one or more pins 114 of I/O chip 112 of second device 104. The second set of pins 116 includes two or more pins. The third set of one or more pins 118 are connected to MCU 110 (i.e., a second chip of device 104). MCU 110 may use the third set of pins 118 for input and output. In some examples, I/O chip 112 does not have a third set of pins. In such examples, another type of chip may be used instead of I/O chip 112.

First device 102 may be configured to operate with various types of second devices. For instance, in an example where first device 102 is a Receiver-in-Canal (RIC) device, first device 102 may be configured to operate with various different types of receivers. However, different types of second devices may have different capabilities, or may be configured to communicate in different ways. Accordingly, first device 102 may need to identify the type of second device 104. After identifying the type of second device 104 may be able to send appropriate data to second device 104 and/or properly interpret data received from second device 104. One conventional way of enabling first device 102 to identify the type of second device 104 is for second device 104 to have a resistor couple to one of the wires of serial communication cable 106. Different resistance values correspond to different types of second devices. However, the use of resistors for this purpose may be slow (e.g., requiring many seconds) and there are a limited number of reliably readable resistance values. Additionally, in instances where second device 104 is a receiver, use of resistors for this purpose may be difficult when the receiver is powered up.

Another conventional way of enabling first device 102 to identify the type of second device 104 is for second device 104 to read a numerical type identifier from a read-only memory (ROM) or random access memory (RAM) and to send this numerical type identifier to first device 102 via serial communication cable 106. However, read operations from memory may consume a significant amount of electrical energy.

Techniques of this disclosure may address these issues by implementing a digital identifier for second device 104. Using a digital identifier over a serial communication line, as described in this disclosure, may be much faster, may have an imperceptible delay to a human to read the digital identifier, may work while second device 104 is powered up, and many more device identifiers may be available than when resistors are used to determine device type. In the context of hearing assistance devices, having more device identifiers available may be desirable with the advent of sensor technology, and other devices in the receiver housing, such as microphones, telecoils, giant magnetoresistance (GMR), tunnel magnetoresistance (TMR), inertial measurement units (IMUs), heart rate sensors, temperature sensors, and other future devices and combinations of devices. For instance, different versions of a device having different sets of sensors may have different device identifiers. Techniques of this disclosure may implement a digital identifier that takes very little current and may work with future devices by utilizing an I$^2$C I/O expander. This solution may be inexpensive, small, ultra-low power, fast, reliable, and does not necessarily require any firmware in second device 104 to work.

For example, in accordance with a technique of this disclosure, second device 104 may send (and first device 102 may receive) a bit sequence via serial communication cable 106. First device 102 may determine, based on the bit sequence, a type of second device 104. Additionally, first device 102 may generate, based on the type of second device 104, data appropriate for use by devices that belong to the type of second device 104. First device 102 may then send the data to second device 104 via serial communication cable 106. In some examples, first device 102 may determine, based on the types of second device 104, how to communicate with second device 104. For instance, first device 102 may determine how to interpret signals sent by second device 104 based on the type of second device 104.

As noted above, serial communication cable 106 has one or more wires 108 that connect first device 102 to a first set of one or more pins 114 of I/O chip 112 of second device 104. Furthermore, as noted above, the second set of pins 116 includes two or more pins. For each respective pin of the second set of pins 116, the bit sequence includes a set of one or more bits for the respective pin based at least in part of whether a first voltage or a second voltage is applied to the respective pin. The first voltage is different from the second voltage. In some examples, for each respective pin of the second set of pins 116, the first voltage is the same (e.g., 3 volts) and the second voltage is the same (e.g., 0 volts). In examples where 2-state logic is used, the set of bits for the respective pin may consist of 1 bit that indicates whether the first voltage or the second voltage is applied to the respective pin. In examples where 3-state logic or 4-state logic is used, the set of bits for the respective pin may include a plurality of bits, which may be set based on whether the first voltage or the second voltage is applied to the respective pin when a programmable pull-up resistor and/or a pull-down resistor are enabled or disabled and whether a resistor connected to the pin is a high impedance resistor or a low impedance resistor. In this disclosure, a high impedance resistor is a resistor having greater impedance than a low impedance resistor that may be used in place of the high impedance resistor.

Bit values generated based on the different combinations of voltages applied to the second set of pins 116 (and in some examples, impedances of resistors connected to the second set of pins 116) serves as de facto device type identifier. In an example that is not dependent on impedances of resistors connected to the second set of pins 116, there may be four pins in the second set of pins 116. In this example, the four pins having voltages of 3V, 0V, 3V, and 3V may identify a different type of device than the four pins having voltages of 3V, 3V, 3V, and 0V. In this example, the corresponding bit sequences may be 1, 0, 1, and 1, and 1, 1, 1, 0, respectively.

In some examples, the voltage applied to one or more pins of the second set of pins 116 (e.g., each pin of the second set of pins 116) is permanently fixed (i.e., the pin has a fixed voltage). That is, in such examples, whenever a voltage value of a pin in the second set of pins 116 is determined, the voltage is always the same. For instance, a pin in the second set of pins 116 may be connected (e.g., using a solder jumper or a removable jumper) to one or more wires that connect to circuit components that ensure that the voltage of an electrical current flowing through the pin is always the same when second device 104 is powered on.

In some examples, MCU 110 or another chip of second device 104 may reuse one or more pins in the second set of pins 116 as general-purpose I/O pins. For example, in such examples, a jumper may connect a particular pin of the second set of pins 116 to a first wire connected to a switch that controls where the first wire receives an electrical current from a second wire or a third wire. In this example, the second wire always provides the same constant voltage. For instance, the second wire may be permanently connected to a pull-up or pull-down resistor, as described elsewhere in this disclosure. Furthermore, in this example, the third wire may be connected to MCU 110. MCU 110 or another circuit may control the switch. In this example, during times when the digital identifier of second device 104 is being determined, the first wire receives the electrical current from the second wire. During other times, in this example, the first wire receives the electrical current from the third wire. MCU 110 may use the third wire to send or receive data from I/O chip 112.

As mentioned above, first device 102 receives a bit sequence from second device 104 via serial communication cable 106. In order to receive the bit sequence, first device 102 may send signals querying the voltages of one or more (e.g., each) of the pins in the second set of pins 116. For example, first device 102 may send a signal that indicates that I/O chip 112 is to send back a bit indicating whether pin 0 of the second set of pins 116 has the first voltage or the second voltage; then first device 102 may send a signal that indicates that I/O chip 112 is to send back a bit indicating whether pin 1 of the second set of pins 116 has the first voltage or the second voltage; and so on. I/O chip 112 may respond to the signals from first device 102 serially, sending the response bits one at a time.

Figure 2:
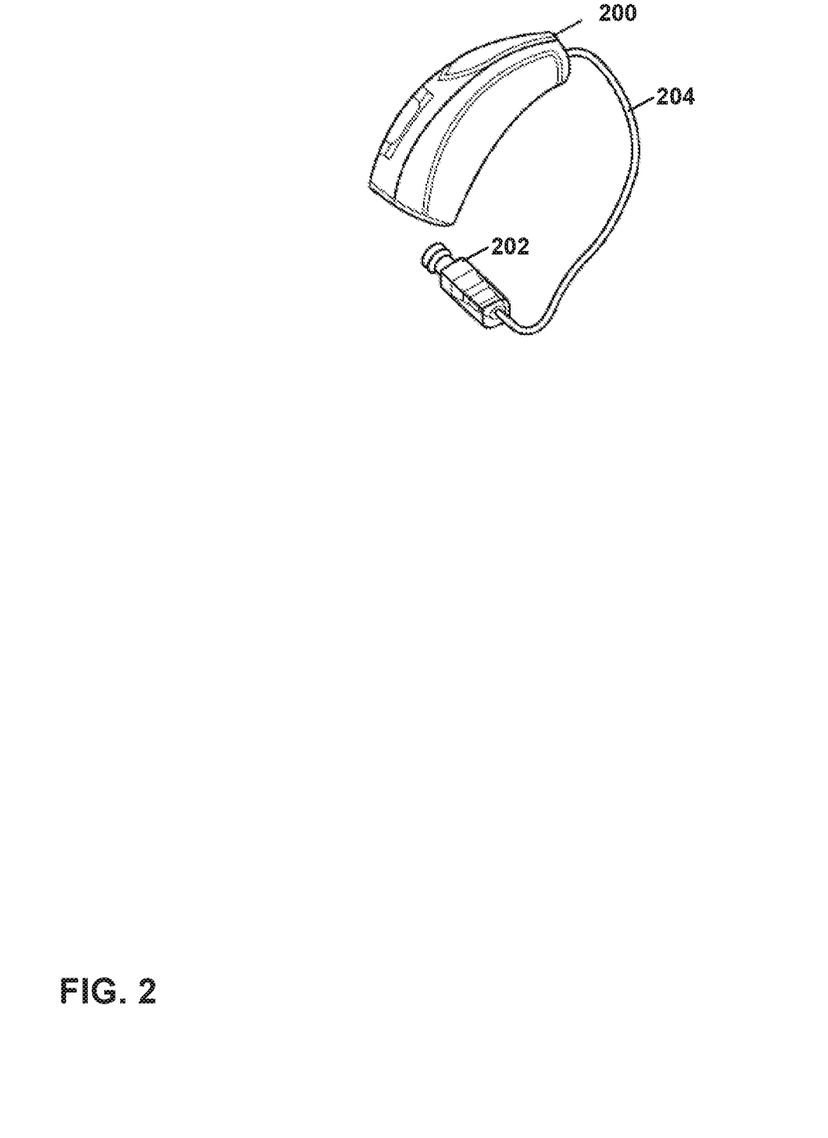
FIG. 2 illustrates an example system that includes a Receiver-in-Canal (RIC) device and a receiver configured according to one or more techniques of this disclosure for identifying one or more devices that communicate via serial cables.

FIG. 2 illustrates an example system that includes a RIC device 200 and a receiver 202 configured according to one or more techniques of this disclosure. In the example of FIG. 2, MC device 200 may be worn behind the ear of a user and receiver 202 may be worn in the ear canal of the user. A serial communication cable 204 communicatively connects RIC device 200 and receiver 202. MC device 200 may be implemented and function in the manner described in this disclosure with respect to first device 102 (FIG. 1) and receiver 202 may be implemented and function in the manner described in this disclosure with respect to second device 104 (FIG. 1), or vice versa. Likewise, serial communication cable 204 may be implemented in the manner described in this disclosure with respect to serial communication cable 106.

Figure 3:
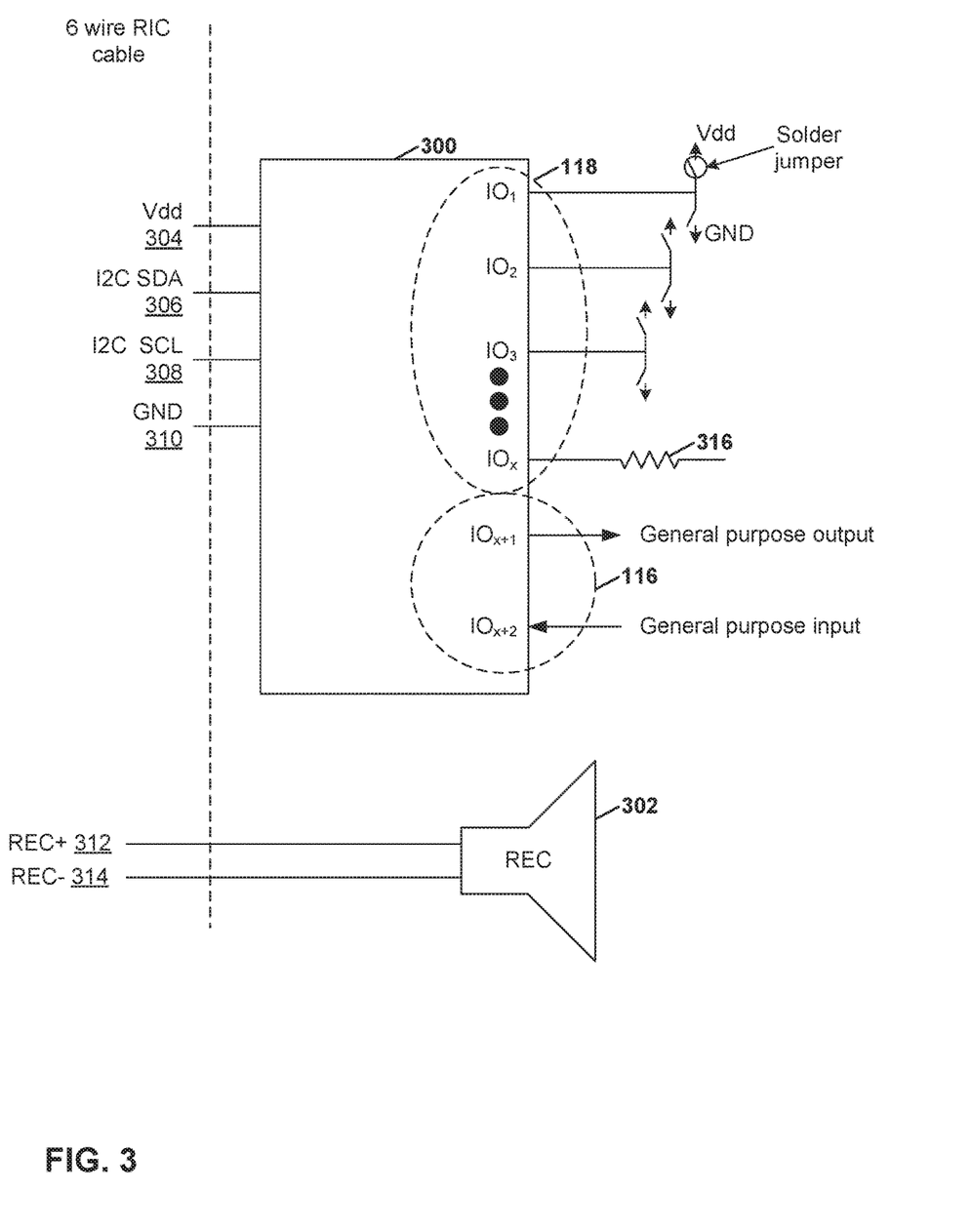
FIG. 3 is a circuit diagram illustrating an example I/O chip, in accordance with a technique of this disclosure for identifying one or more devices that communicate via serial cables.

FIG. 3 is a circuit diagram illustrating an example I/O chip 300, in accordance with a technique of this disclosure. I/O chip 300 may be a specific implementation of I/O chip 112 described elsewhere in this disclosure. FIG. 3 also illustrates an example receiver 302. Receiver 302 is a component that generates sound in response to electrical signals. Hence, receiver 302 may be considered to be a type of speaker.

In the example of FIG. 3, serial communication cable 106 is a 6-wire RIC cable. The 6 wires of the RIC cable are a Vdd wire 304, an I2C SDA wire 306, an I2C SCL wire 308, a ground wire 310, a receiver positive wire 312, and a receiver negative wire 314. Vdd wire 304 is a positive supply voltage wire. I2C SDA wire 306 is a serial data line used for communicating data between I/O chip 300 and another chip (e.g., a chip of first device 102 (FIG. 1). I2C SCL wire 308 is used to send a clock signal to I/O chip 300. Ground wire 310 is used to provide a ground and may serve in conjunction with Vdd wire 304 to provide electrical energy to I/O chip 300 or second device 104 in general. Different pins of I/O chip 300 are connected to different ones of Vdd wire 304, I2C SDA wire 306, I2C SCL wire 308, and ground wire 310. Receiver positive wire 312 and receiver negative wire 314 may be used to drive receiver 302.

I/O chip 300 includes a set of I/O pins labeled in FIG. 3 as $IO_1$, $IO_2$, $IO_3$ through $IO_x$, $IO_{x+1}$, and $IO_{x+2}$. In the example of FIG. 3, I/O pins $IO_1$ through $IO_x$ may be in the second set of pins 116 (FIG. 1) and I/O pins $IO_{x+1}$ and $IO_{x+2}$ may be in the third set of pins 118 (FIG. 1). Thus, I/O pins $IO_{x+1}$ and $IO_{x+2}$ may be communicatively coupled to MCU 110. Particularly, in the example of FIG. 3, I/O pin $IO_{x+1}$ may serve as a general-purpose output pin from I/O chip 300 to MCU 110 and I/O pin $IO_{x+2}$ may serve as a general-purpose input pin to I/O chip 300 from MCU 110. Thus, some I/O pins of I/O chip 300 may be dedicated to performing as a digital input or output for additional digital logic, switches, or interrupts. In this case, an embodiment of I/O chip 300 may still have 8 pins for a digital identifier, and 8 pins for General Purpose I/Os (GPIOs).

Furthermore, in the example of FIG. 3, I/O pins $IO_1$ through $IO_x$ are connected (e.g., with solder jumpers) to either a positive voltage supply rail (Vdd) or a ground (GND). Thus, I/O chip 300 may receive a signal on I2C SDA wire 306 requesting a value that indicates whether the voltage on I/O pin $IO_1$ is the first voltage associated with the positive voltage supply rail (Vdd) or the second voltage associated with the ground. Circuitry in I/O chip 300 may send back on I2C SDA wire 306 a bit indicating whether I/O pin $IO_1$ has the first voltage or the second voltage. A similar process may occur for the rest of I/O pins $IO_2$ through $IO_x$. In some examples, instead of using the I2C SDA wire 306, a power supply wire (e.g., Vdd wire 304) is used for communication with first device 102.

In some examples, to use I/O pins $IO_1$ to $IO_x$ as a digital identifier, solder jumpers may be shorted to either a positive supply rail (Vdd), or ground (GND). Thus, a solder jumper may connect an I/O pin to either a wire providing a first voltage or a wire providing a second voltage. If an I/O pin is shorted to the positive supply rail, then that pin may be read as a binary 1 (or 0). If the I/O pin is shorted to GND, then that pin may be read as a binary 0 (or 1). Due to size limitations, it may be beneficial to only have four input pins as the digital identifier. With four pins, the number of digital identifiers possible is 2^4=16. With four pins and 3-state logic, the number of digital identifiers possible is 3^4=81. With four pins and 4-state logic, the number of digital identifiers possible is 4^4=256. Other numbers of I/O pins may be 8, 16, 24, 32, etc.

In some examples, one or more of I/O pins $IO_1$ to $IO_x$ may be permanently connected to a resistor, such as resistor 316, which is connected to a wire. In such examples, the resistor may be either a pull-up resistor that pulls a voltage of the wire up to a first voltage (e.g., 3V) or the resistor is a pull-down resistor that pulls the voltage of the wire down to a second voltage (e.g., ground). In examples where programmable pull-up and/or pull-down resistors are not used in determining the digital identifier of second device 104, connecting an I/O pin to such a resistor may have a similar effect as using a solder jumper to connect the I/O pin to a wire having the first or second voltage.

Because I²C is a communication bus, it may be also possible to use more than one I/O expander chip to make more pins available for digital identifier or general-purpose I/O pins. However, in some examples where second device 104 is a receiver, using a single 32-pin integrated circuit may be disadvantageous because of the size of the integrated circuit. However, in such examples, two 16-pin integrated circuits may be mounted to a flex and wrapped around the receiver to get 32 pins. This technique may be used to cover each of the four sides of the receiver with I/O expanders to provide 64 possible general-purpose I/O pins. This again would not be advantageous in some instances as there may be limited room left over for additional digital logic, switches, and interrupts. In the case that a receiver is built with an earmold, then there may be additional room within the earmold for more digital logic, including more I/O expanders, switches, sensors, interrupts, etc.

In some examples, I/O pins $IO_1$ through $IO_{x+2}$ are dual purpose. That is, I/O pins $IO_1$ through $IO_{x+2}$ may be used for both providing a digital identifier and general-purpose communication. For instance, the I/O pins $IO_1$ through $IO_{x+2}$ may be dual purpose by pulling the digital ID input lines high or low through a resistor. For example, an I/O pin may be connected to a wire that is further connected to a resistor that is connected to a high or low voltage source. Furthermore, in this example, the wire is also connected to a chip (e.g., MCU 110). The chip controls whether electrical current from the chip or electrical current passing through the resistor reaches the I/O pin. Thus, during device identification, I/O chip 112 may use the voltage of the electrical current passing through the resistor to determine the set of bits for the I/O pin. However, in this example, outside of device identification, I/O chip 112 may use the voltage of the current from the chip as input. I/O chip 112 may use the I/O pin for output in a similar fashion. In some such examples, 16 general-purpose I/O pins are used for 16 digital identifier values, as well as 16 inputs and outputs for other digital logic effectively using one pin for two purposes. This may involve more parts in manufacturing, and a slight size increase, although passive resistors can be quite small and cost fractions of a cent.

In some examples, the digital identifier techniques of this disclosure are backwards compatible with resistive identifiers. For instance, in one example, first device 102 may first try to detect a digital identifier because doing so may take less time than determining a resistive identifier. However, in this example, if first device 102 does not receive a bit sequence corresponding to a digital identifier, firmware of first device 102 may revert back to searching for a resistive identifier. To provide a resistive identifier, a power line may be tied to a general-purpose I/O pin on a digital signal processor (DSP) of first device 102. The DSP can be configured for analog measurements or digital output. A digital high could then turn on power to the general-purpose I/O pin to power up the digital circuitry, if it exists, and read the digital identifier. If the digital identifier is not returned, then the DSP of first device 102 may reconfigure the general-purpose I/O pin for an analog measurement and first device 102 reads the resistive identifier.

Figure 4:
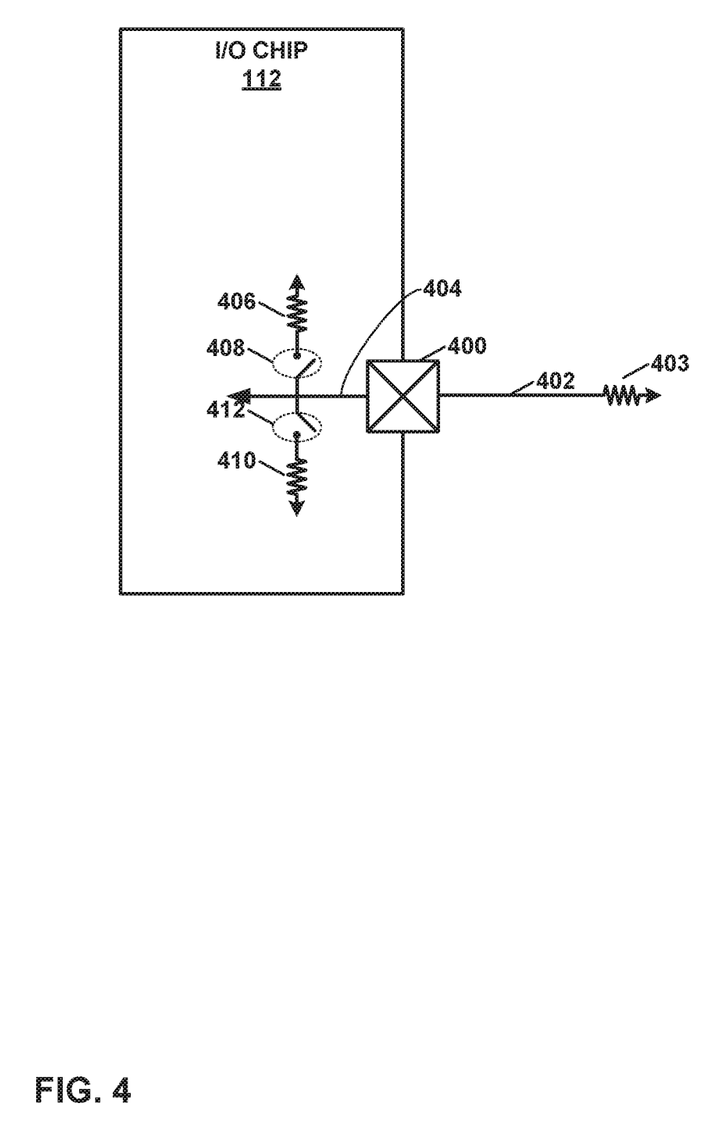
FIG. 4 is a circuit diagram illustrating an example I/O pin for four-state logic, in accordance with a technique of this disclosure for identifying one or more devices that communicate via serial cables.

FIG. 4 is a circuit diagram illustrating an example I/O pin for four-state logic, in accordance with a technique of this disclosure. In the example of FIG. 4, I/O chip 112 includes an I/O pin 400 that connects an external wire 402 and an internal wire 404. External wire 404 is external to I/O chip 112. Internal wire 404 is internal to I/O chip 112. I/O pin 400 may be one of I/O pins $IO_1$ through $IO_x$ of FIG. 3, or in some examples $IO_1$ through $IO_{x+2}$ of FIG. 3. Although only one I/O pin is shown in FIG. 4, I/O chip 112 may also include one or more I/O pins configured in the same way as I/O pin 400.

In the example of FIG. 4, external wire 402 is connected to a resistor 403, which in turn is connected to a voltage source having a first voltage or a second voltage. Internal wire 404 is selectively connected to a pull-up resistor 406 via a switch 408. Additionally, in the example of FIG. 4, internal wire 404 is selectively connected to a pull-down resistor 410 via a switch 412. Switch 408 and switch 412 may be implemented as individual transistors, or combinations of one or more types of electrical circuit components. In this disclosure, pull-up resistor 406 is said to be "enabled" when switch 408 is closed and "disabled" when switch 408 is open. Likewise, pull-down resistor 410 is said to be "enabled" when switch 412 is closed and "disabled" when switch 412 is open. In some examples, switch 408 and 412 may be implemented as a three-way switch such that, in effect, switch 408 and 412 are both open or one of switches 408, 412 is closed, but both of switches 408, 412 are not closed at the same time. Pull-up resistor 406 and pull-down resistor 410 may be considered "programmable" because switches 408 and 412 may be programmatically controlled by I/O chip 112, which may in turn be controlled by first device 102.

In this disclosure, a default voltage is the voltage of internal wire 404 when both switch 408 and switch 412 are open. The default voltage may be a first voltage or a second voltage, depending on whether resistor 403 is a pull-up resistor or a pull-down resistor. The first voltage is higher than the second voltage.

Pull-up resistor 406 is designated a pull-up resistor because pull-up resistor 406 may pull up the voltage of internal wire 404 from the default voltage to a first modified voltage. In instances where the default voltage is the second voltage (i.e., the lower voltage of the first and second voltages) and resistor 403 has a high impedance, the first modified voltage has a voltage higher than the second voltage (e.g. a voltage equal to the higher first voltage). However, in instances where the default voltage is the second voltage and resistor 403 has the low impedance, the first modified voltage may be the same as the second voltage (where the high impedance is an impedance higher than a low impedance).

Pull-down resistor 410 is designated a pull-down resistor because pull-down resistor 410 may pull down the voltage of internal wire 404 from the default voltage to a second modified voltage. In instances where the default voltage is the first voltage (i.e., the higher voltage of the first and second voltages) and resistor 403 has a high impedance, the second modified voltage has a voltage lower than the first voltage (e.g., a voltage equal to the lower second voltage). However, in instances where the default voltage is the first voltage and resistor 403 has the low impedance, the second modified voltage may be the same as the first voltage.

For instance, in an example where resistor 403 is a "low" impedance resistor, resistor 403 may be a solder jumper or a 0 ohm resistor. In another example where resistor 403 is a "low" impedance resistor, resistor 403 may have an impedance at least x times smaller (e.g., 2 times smaller, 3 times smaller, or other value where x is greater than 1) than impedances of pull-up resistor 406 and pull-down resistor 410. In an example where resistor 403 is a "high" impedance resistor, resistor 403 may have an impedance at least x times greater (e.g., 2, times larger, 3 times larger, or other value where x is greater than 1) than impedances of pull-up resistor 406 and pull-down resistor 410. For instance, in an example where the impedance of pull-up resistor 406 and/or pull-down resistor 410 is 100 kOhm, resistor 403 may be a "low" impedance resistor if a resistance of resistor 403 is less than or equal to 33 kOhm, and resistor 403 may be a "high" impedance resistor if the resistance of resistor 403 is greater than or equal to 300 kOhm.

In accordance with a technique of this disclosure, when first device 102 is determining a digital identifier of second device 104, the bit sequence generated by I/O chip 112 may include a plurality of bits (i.e., two or more bits) for I/O pin 400. To determine the values of the plurality of bits for I/O pin 400, I/O chip 112 may take a first voltage measure on internal wire 404 when pull-up resistor 406 is disabled and pull-down resistor 410 is disabled. Additionally, I/O chip 112 may take a second voltage measurement when pull-up resistor 406 is enabled and pull-down resistor 410 is disabled. I/O chip 112 may take a third voltage measurement when pull-down resistor 410 is enabled and pull-up resistor 406 is disabled. I/O chip 112 may determine the values of the plurality of bits for I/O pin 400 based on the first voltage measurement, the second voltage measurement, and the third voltage measurement. Since the first voltage measurement indicates whether internal wire 404 has the first voltage or the second voltage, the set of bits for I/O pin 400 is based at least in part on whether the first voltage or the second voltage is applied to I/O pin 400, even when the plurality of bits is also based on the second and third voltage measurements.

Table 1, below, provides an example of how I/O chip 112 may determine the values of the plurality of bits for I/O pin 400:

TABLE 1

| internal programmable medium impedance (0 = disabled, 1 = enabled) | | configurable pin | pin reading | sum |
|---|---|---|---|---|
| pull-up | pull-down | | | |
| 0 | 0 | low-impedance pull-up | 1 | 3 |
| 1 | 0 | low-impedance pull-up | 1 | |
| 0 | 1 | low-impedance pull-up | 1 | |
| 0 | 0 | high-impedance pull-up | 1 | 2 |
| 1 | 0 | high-impedance pull-up | 1 | |
| 0 | 1 | high-impedance pull-up | 0 | |
| 0 | 0 | low-impedance pull-down | 0 | 0 |
| 1 | 0 | low-impedance pull-down | 0 | |
| 0 | 1 | low-impedance pull-down | 0 | |
| 0 | 0 | high-impedance pull-down | 0 | 1 |
| 1 | 0 | high-impedance pull-down | 1 | |
| 0 | 1 | high-impedance pull-down | 0 | |

In the first column of Table 1 above, the values 0 and 1 indicate whether the corresponding pull-up resistor 406 or pull-down resistor 410 is enabled. Pull-up resistor 406 and pull-down resistor 410 are termed medium impedance because the impedances of pull-up resistor 406 and pull-down resistor 410 are between the possible high and low impedances of resistor 403. In the third column of Table 1, the value 1 indicates a first voltage on external wire 402 and value 0 indicates a second voltage on external wire 402, where the first voltage is greater than the second voltage. Furthermore, in some examples, I/O chip 112 may sum the values of a first, second, and third intermediate value to determine the values of the plurality of bits for I/O pin 400. For instance, the sum of 3 may correspond to bit values 1,1; the sum of 2 may correspond to bit values 1,0; the sum of 1 may correspond to bit values 0,1; and the sum of 0 may correspond to bit values 0,0. In other examples, rather than I/O chip 112 summing the values, first device 102 may sum the values, or simply use the voltage measurements as part of the digital identifier of the second device.

Thus, I/O chip 112 may take a first voltage reading of I/O pin 400 when pull-up resistor 406 and pull-down resistor 410 are disabled. The first voltage reading is 1 when resistor 403 pulls the voltage of wire 402 to the higher first voltage.

The first voltage reading is 0 when resistor 403 pulls the voltage of wire 402 to the lower second voltage.

Additionally, I/O chip 112 may take a second voltage reading of I/O pin 400 when pull-up resistor 406 is enabled and pull-down resistor 410 is disabled. If the first voltage reading is 1, the second voltage reading is 1 regardless of whether resistor 403 is a high-impedance or low-impedance resistor. If the first voltage reading is 0, the second voltage reading is 0 if resistor 403 is a low-impedance resistor and the second voltage reading is 1 if resistor 403 is a high-impedance resistor.

I/O chip 112 may take a third voltage reading of I/O pin 400 when pull-down resistor 410 is enabled and pull-up resistor 406 is disabled. If the first voltage reading is 1, the third voltage reading is 0 if resistor 403 is a high-impedance resistor and the third voltage reading is 1 if resistor 403 is a low-impedance resistor.

Thus, as shown in the example of Table 1, I/O chip 112 may determine that resistor 403 is a low-impedance pull-up resistor if the first voltage reading is 1, the second voltage reading is 1, and the third voltage reading is 1. I/O chip 112 may determine that resistor 403 is a high-impedance pull-up resistor if the first voltage reading is 1, the second voltage reading is 1, and the third voltage reading is 0. I/O chip 112 may determine that resistor 403 is a low-impedance pull-down resistor if the first voltage reading is 0, the second voltage reading is 0, and the third voltage reading is 0. I/O chip 112 may determine that resistor 403 is a high-impedance pull-down resistor if the first voltage reading is 0, the second voltage reading is 1, and the third voltage reading is 0.

Furthermore, as shown in the example of Table 1, if resistor 403 is a low-impedance pull-up resistor, the resulting sum of the first, second, and third voltage readings is 3. If resistor 403 is a high-impedance pull-up resistor, the resulting sum of the first, second, and third voltage readings is 2. If resistor 403 is a low-impedance pull-down resistor, the resulting sum of the first, second, and third voltage readings is 0. If resistor 403 is a high-impedance pull-down resistor, the resulting sum of the first, second, and third voltage readings is 1. I/O chip 112 may set the plurality of bits for I/O pin 400 based on (e.g., equal to) the sum.

In other examples, pull-up resistor 406, switch 408, pull-down resistor 410, and switch 412 are external to I/O chip 112 and are connected to external wire 402 instead of internal wire 404. Otherwise, the system may work the same way as described above with respect to FIG. 4.

Thus, in the example of FIG. 4, at least one particular pin (e.g., I/O pin 400) of the second set of pins 118 (FIG. 1) is connected to a wire (e.g., internal wire 404 or external wire 402) that is connected to an external resistor (e.g., resistor 403). The wire is also connected to a programmable pull-up resistor (e.g., pull-up resistor 406) and a pull-down resistor (e.g., pull-down resistor 410). When the programmable pull-up resistor is disabled and the programmable pull-down resistor is disabled, the external resistor pulls a voltage of the wire to the higher first voltage or the lower second voltage. When the programmable pull-up resistor is enabled, the programmable pull-up resistor pulls the voltage of the wire to a third voltage or a fourth voltage depending on the impedance of the external resistor. When the programmable pull-down resistor is enabled, the programmable pull-down resistor pulls the voltage of the wire to a fifth voltage or a sixth voltage depending on the impedance of the external resistor. Furthermore, in this example, the two bits for the particular pin are based on:

whether the voltage of the wire is the first voltage or the second voltage when neither the programmable pull-up resistor nor the programmable pull-down resistor is enabled, whether the voltage of the wire is the third voltage or the fourth voltage when the programmable pull-up resistor is enabled, and whether the voltage of the wire is the fifth voltage or the sixth voltage when the programmable pull-down resistor is enabled. In some examples, the third voltage and the fifth voltage are equal to the first voltage and the fourth voltage and the sixth voltage are equal to the second voltage. Table 1 may be used to determine the bin values based on these factors.

In some examples, instead of using four-state logic as described above with respect to FIG. 4, three-state logic is used. In such examples, either pull-up resistor 406) or pull-down resistor 410 is omitted. In one such example, a particular pin (e.g., I/O pin 400) is connected to a wire (e.g., internal wire 404 or external wire 402) that is connected to an external resistor (e.g., resistor 403). The wire is further connected to a programmable resistor (e.g., pull-up resistor 406 or pull-down resistor 410). When the programmable resistor is disabled, the external resistor pulls a voltage of the wire to the first voltage or the second voltage. When enabled, the programmable resistor pulls the voltage of the wire to a third voltage or a fourth voltage depending on the impedance of the external resistor. For instance, if the programmable resistor is a pull-up resistor (e.g., pull-up resistor 406), the default voltage is the lower second voltage, the pull-up resistor may pull the voltage to a third voltage (e.g., a voltage equal to the second voltage) or a fourth voltage (e.g., a voltage higher than the second voltage) depending on whether the external resistor has the higher or lower impedance. In this example, the two bits for the particular pin are based on:

whether the voltage of the wire is the first voltage or the second voltage when the programmable resistor is not enabled, and whether the voltage of the wire is the third voltage or the fourth voltage when the programmable resistor is enabled.

Table 1 may be used, ignoring either pull-up resistor 406 or pull-down resistor 410, to determine the values of the bits.

Figure 5:
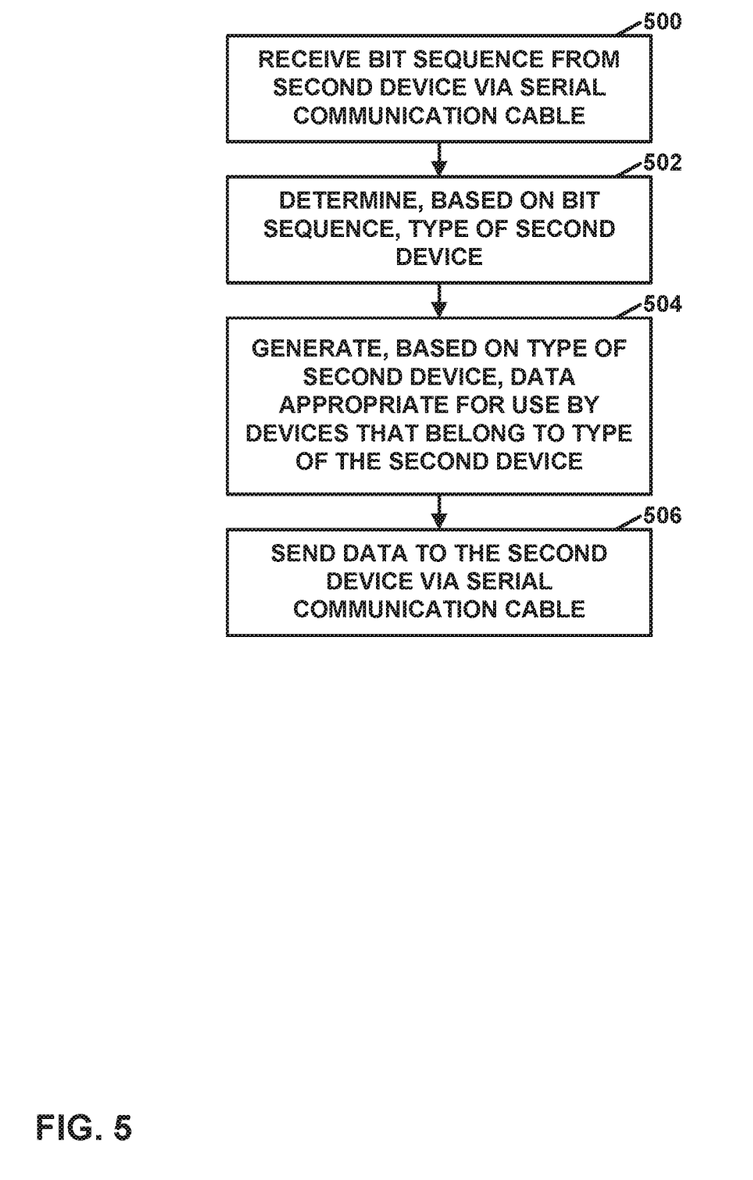
FIG. 5 is a flowchart illustrating an example operation in accordance with one or more aspects of this disclosure.

FIG. 5 is a flowchart illustrating an example operation in accordance with one or more aspects of this disclosure. The flowchart of FIG. 5 of this disclosure is provided as an example. In other examples, operations shown in the flowchart may include more, fewer, or different actions, or actions may be performed in different orders or in parallel.

In the example of FIG. 5, first device 102 (FIG. 1) may receive a bit sequence from second device 104 (FIG. 1) via serial communication cable 106 (FIG. 1) having one or more wires 108 (FIG. 1) that connect first device 102 to a first set of one or more pins 114 (FIG. 1) of a first chip (e.g., I/O chip 112) of second device 104 (500). The first chip has a second set of two or more pins 116 (FIG. 1) and, in some examples, a third set of one or more pins 118 (FIG. 1). The third set of one or more pins 118 may be connected to a second chip (e.g., MCU 110) of second device 104. For each respective pin of the second set of pins 116, the bit sequence includes a set of one or more bits for the respective pin based at least in part on whether a first voltage or a second voltage is applied to the respective pin. The first voltage is different from the second voltage. In some examples, for each respective pin of the third set of pins, the first voltage is the same and the second voltage is a ground voltage.

Furthermore, in some examples, the first voltage and the second voltage are permanently fixed. For instance, in some examples, a solder jumper may connect a pin of the second set of pins to either a wire providing the first voltage or a wire providing the second voltage. In some examples, at least one pin of the second set of pins is permanently connected to a resistor that is further connected to a wire. In this example, either the resistor is a pull-up resistor that pulls a voltage of the wire to the first voltage, or the resistor is a pull-down resistor that pulls the voltage of the wire to the second voltage.

In examples where resistors 406 and 410 are not used in determining the digital identifier, the set of bits for the respective pin may be 1 bit that indicates whether the first voltage or the second voltage is applied to the respective pin. In other examples, the set of bits for at least one pin of the second set of pins is determined based on whether an impedance of a resistor (e.g., resistor 403 of FIG. 4) connected to the pin is a first (e.g., high) impedance or a second (e.g., low) impedance, as described elsewhere in this disclosure.

Furthermore, in the example of FIG. 5, first device 102 determines, based on the bit sequence, a type of second device 104 (502). First device 102 may determine the type of second device 104 in various ways based on the bit sequence. For example, first device 102 may store a lookup table that maps different bit sequences to different types of devices. In this example, each different type of device may have a different code. Furthermore, in this example, first device 102 may store the code in a register or other memory location that first device 102 is configured to check when determining how to send data to second device 104 or interpret data from second device 104. In some examples, first device 102 simply stores the bit sequence in the register or other memory location in place of a different code. In such examples, determining the type of second device 104 may occur as part of first device 102 determining how to generate data to send to second device 104 or how to interpret data received from second device 104. For instance, first device 102 may run a program that includes statements such as "if the bit sequence is $X_1$, then do $Y_1$," and "if the bit sequence is $X_2$, then do $Y_2$," where $X_1$ and $X_2$ are different values (either codes or the bit sequence itself) that identifies the type of second device 104.

In the example of FIG. 5, first device 102 may generate, based on the type of second device 104, data appropriate for use by devices that belong to the type of the second device (504). For example, different types of second devices may use different series of bits to indicate the same command. Accordingly, in this example, when first device 102 is to send the command to second device 104, first device 102 may determine, based on the type of second device 104, which series of bits is used by second device 104 to indicate the command. First device 102 may then send the data to second device 104 via serial communication cable 106 (506). For instance, as in the example of FIG. 3, first device 102 may send the data via I2C SDA wire 306.

In some examples, digital identifiers are implemented in a microprocessor of second device 104 (e.g., in firmware of a microprocessor of second device 104) instead of I/O chip 112 of second device 104. In some such examples, first device 102 may be required to get additional information from a microprocessor of second device 104 along with the digital identifier of second device 104 to identify second device 104 and its capabilities. In such examples, pins of the microprocessor of second device 102 may be used in the manner described elsewhere in this disclosure with respect to I/O chip 112 to determine the digital identifier of second device 104.

In this disclosure, ordinal terms such as "first," "second," "third," and so on, are not necessarily indicators of positions within an order, but rather may simply be used to distinguish different instances of the same thing. Examples provided in this disclosure may be used together, separately, or in various combinations.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for inter-device communication, the method comprising:
   receiving, by a first device, a bit sequence from a second device via a serial communication cable having one or more wires that connect the first device to a first set of one or more pins of a first chip of the second device, the first chip having a second set of pins, wherein, for each respective pin of the second set of pins, the bit sequence includes a set of one or more bits for the respective pin based at least in part on whether a first voltage or a second voltage is applied to the respective pin, the first voltage being different from the second voltage;
   determining, by the first device, based on the bit sequence, a type of the second device;
   generating, by the first device, based on the type of the second device, data appropriate for use by devices that belong to the type of the second device; and
   sending, by the first device, the data to the second device via the serial communication cable.

2. The method of claim 1, wherein, for each respective pin of the second set of pins, the first voltage is the same and the second voltage is a ground voltage.

3. The method of claim 1, wherein the first voltage and the second voltage are permanently fixed.

4. The method of claim 3, wherein a solder jumper connects a pin of the second set of pins to either a wire providing the first voltage or a wire providing the second voltage.

5. The method of claim 3, wherein:
   at least one pin of the second set of pins is permanently connected to a resistor that is further connected to a wire, and either:
   the resistor is a pull-up resistor that pulls a voltage of the wire to the first voltage, or
   the resistor is a pull-down resistor that pulls the voltage of the wire to the second voltage.

6. The method of claim 1, wherein for at least one particular pin of the second set of pins, the bit sequence is based at least in part on whether an impedance of an external resistor connected to the pin is a first impedance or a second impedance, where the first impedance is higher than the second impedance.

7. The method of claim 6, wherein:
   the wire is further connected to a programmable resistor,
   when the programmable resistor is disabled, the external resistor pulls a voltage of the wire to the first voltage or the second voltage,
   when the programmable resistor is enabled, the programmable resistor pulls the voltage of the wire to a third voltage or a fourth voltage depending on the impedance of the external resistor, and
   the two bits for the particular pin are based on:
     whether the voltage of the wire is the first voltage or the second voltage when the programmable resistor is not enabled, and
     whether the voltage of the wire is the third voltage or the fourth voltage when the programmable resistor is enabled.

8. The method of claim 6, wherein:
   the wire is further connected to a programmable pull-up resistor and a programmable pull-down resistor,
   when the programmable pull-up resistor is disabled and the programmable pull-down resistor is disabled, the external resistor pulls a voltage of the wire to the first voltage or the second voltage,
   when the programmable pull-up resistor is enabled, the programmable pull-up resistor pulls the voltage of the wire to a third voltage or a fourth voltage depending on the impedance of the external resistor,
   when the programmable pull-down resistor is enabled, the programmable pull-down resistor pulls the voltage of the wire to a fifth voltage or a sixth voltage depending on the impedance of the external resistor, and
   the two bits for the particular pin are based on:
     whether the voltage of the wire is the first voltage or the second voltage when neither the programmable pull-up resistor nor the programmable pull-down resistor is enabled,
     whether the voltage of the wire is the third voltage or the fourth voltage when the programmable pull-up resistor is enabled, and
     whether the voltage of the wire is the fifth voltage or the sixth voltage when the programmable pull-down resistor is enabled.

9. The method of claim 1, wherein at least one pin of the second set of pins is permanently connected to a first wire connected to a switch that is further connected to a second wire and a third wire, the second wire having a fixed voltage, and the third wire being connected to an input/output pin of a second chip of the second device.

10. The method of claim 1, wherein the first chip is an I²C I/O expander chip.

11. The method of claim 1, wherein the first device is a Receiver-in-Ear (RIC) device of a hearing aid system, and the second device is a receiver of the hearing aid system.

12. The method of claim 1, wherein the second device further comprises a second chip, and the first chip has a third set of one or more pins connected to the second chip.

13. A system comprising:
a first device;
a second device comprising a first chip, the first chip having a first set of one or more pins and a second set of pins, wherein, for each respective pin of the second set of pins, the bit sequence includes a set of one or more bits for the respective pin based at least in part on whether a first voltage or a second voltage is applied to the respective pin, the first voltage being different from the second voltage; and
a serial communication cable, wherein the serial communication cable has one or more wires that connect the first device to the first set of one or more pins of the first chip of the second device,
wherein the first device is configured to:
receive a bit sequence from the second device via the serial communication cable;
determine, based on the bit sequence, a type of the second device;
generate, based on the type of the second device, data appropriate for use by devices that belong to the type of the second device; and
send the data to the second device via the serial communication cable.

14. The system of claim 13, wherein, for each respective pin of the second set of pins, the first voltage is the same and the second voltage is a ground voltage.

15. The system of claim 13, wherein the first voltage and the second voltage are permanently fixed.

16. The system of claim 15, wherein the second device comprises a solder jumper that connects a pin of the second set of pins to either a wire providing the first voltage or a wire providing the second voltage.

17. The system of claim 15, wherein:
at least one pin of the second set of pins is permanently connected to a resistor that is further connected to a wire, and
either:
the resistor is a pull-up resistor that pulls a voltage of the wire to the first voltage, or
the resistor is a pull-down resistor that pulls the voltage of the wire to the second voltage.

18. The system of claim 13, wherein for at least one particular pin of the second set of pins, the bit sequence is based at least in part on whether an impedance of an external resistor connected to the pin is a first impedance or a second impedance, where the first impedance is higher than the second impedance.

19. The system of claim 18, wherein:
the wire is further connected to a programmable resistor,
when the programmable resistor is disabled, the external resistor pulls a voltage of the wire to the first voltage or the second voltage,
when the programmable resistor is enabled, the programmable resistor pulls the voltage of the wire to a third voltage or a fourth voltage depending on the impedance of the external resistor, and
the two bits for the particular pin are based on:
whether the voltage of the wire is the first voltage or the second voltage when the programmable resistor is not enabled, and
whether the voltage of the wire is the third voltage or the fourth voltage when the programmable resistor is enabled.

20. The system of claim 18, wherein:
the wire is also connected to a programmable pull-up resistor and a programmable pull-down resistor,
when the programmable pull-up resistor is disabled and the programmable pull-down resistor is disabled, the external resistor pulls a voltage of the wire to the first voltage or the second voltage,
when the programmable pull-up resistor is enabled, the programmable pull-up resistor pulls the voltage of the wire to a third voltage or a fourth voltage depending on the impedance of the external resistor,
when the programmable pull-down resistor is enabled, the programmable pull-down resistor pulls the voltage of the wire to a fifth voltage or a sixth voltage depending on the impedance of the external resistor, and
the two bits for the particular pin are based on:
whether the voltage of the wire is the first voltage or the second voltage when neither the programmable pull-up resistor nor the programmable pull-down resistor is enabled,
whether the voltage of the wire is the third voltage or the fourth voltage when the programmable pull-up resistor is enabled, and
whether the voltage of the wire is the fifth voltage or the sixth voltage when the programmable pull-down resistor is enabled.

21. The system of claim 13, wherein the second device further comprises a second chip, and at least one pin of the second set of pins is permanently connected to a first wire connected to a switch that is further connected to a second wire and a third wire, the second wire having a fixed voltage, and the third wire being connected to an input/output pin of the second chip.

22. The system of claim 13, wherein the first chip is an $I^2C$ I/O expander chip.

23. The system of claim 13, wherein the first device is a Receiver-in-Ear (RIC) device of a hearing aid system, and the second device is a receiver of the hearing aid system.

24. The system of claim 13, wherein the second device further comprises a second chip, and the first chip has a third set of one or more pins connected to the second chip.

* * * * *